US00RE38833E

(19) United States
(12) Reissued Patent
Linsmeyer

(10) Patent Number: US RE38,833 E
(45) Date of Reissued Patent: Oct. 18, 2005

(54) CALIPER TYPE BOW STRING RELEASE HAVING PUSH/PULL TRIGGER AND AUTOMATIC ALIGNMENT AND LOCKING FEATURES

(75) Inventor: Louis R. Linsmeyer, Hustisford, WI (US)

(73) Assignee: Tru-Fire Corporation, North Fond du Lac, WI (US)

(21) Appl. No.: 10/084,118

(22) Filed: Feb. 25, 2002

Related U.S. Patent Documents

Reissue of:
(64) Patent No.: 5,564,407
Issued: Oct. 15, 1996
Appl. No.: 08/212,083
Filed: Mar. 14, 2004

U.S. Applications:
(63) Continuation-in-part of application No. 07/979,106, filed on Nov. 20, 1992, now Pat. No. 5,357,939.

(51) Int. Cl.[7] ..... F41B 5/18
(52) U.S. Cl. ..... 124/35.2
(58) Field of Search ..... 124/35.1, 35.2, 124/80

(56) References Cited

U.S. PATENT DOCUMENTS

| | | | | |
|---|---|---|---|---|
| 228,302 | A | | 6/1880 | Beard |
| 750,988 | A | * | 2/1904 | Lotz ..... 124/35.1 X |
| 1,542,159 | A | | 6/1925 | Maxwell |
| 2,000,015 | A | | 5/1935 | Flury |
| 2,637,311 | A | | 5/1953 | Rose |
| 2,929,372 | A | | 3/1960 | Vance |
| 2,936,749 | A | | 5/1960 | Chellstorp |
| 2,996,059 | A | | 8/1961 | Vance |
| 3,004,532 | A | | 10/1961 | Vance |
| 3,028,852 | A | | 4/1962 | Sutton, Jr. |
| 3,072,115 | A | | 1/1963 | Johnson |
| 3,604,407 | A | | 9/1971 | Wilson et al. |
| 3,672,346 | A | * | 6/1972 | Plumb ..... 124/35.2 |
| 3,749,076 | A | | 7/1973 | Suski et al. |
| 3,815,908 | A | | 6/1974 | Hashimoto |
| 3,845,752 | A | | 11/1974 | Barner |
| 3,857,379 | A | | 12/1974 | Burghardt |
| 3,873,068 | A | | 3/1975 | Allen |
| 3,890,692 | A | | 6/1975 | Jandura, Jr. |
| 3,898,974 | A | | 8/1975 | Keck |
| 3,921,615 | A | | 11/1975 | Dodge |
| 3,954,095 | A | | 5/1976 | Lewis |
| 3,998,202 | A | | 12/1976 | Boyko |
| 4,004,564 | A | | 1/1977 | Castonguay |
| 4,009,703 | A | | 3/1977 | Cunningham, Sr. |
| 4,041,926 | A | | 8/1977 | Troncoso, Jr. et al. |
| 4,047,250 | A | | 9/1977 | Norman |
| 4,062,339 | A | | 12/1977 | Wilson |
| 4,066,060 | A | | 1/1978 | Napier |
| 4,083,348 | A | | 4/1978 | Fletcher |
| 4,105,011 | A | | 8/1978 | Chism |
| 4,151,825 | A | | 5/1979 | Cook |
| 4,160,437 | A | | 7/1979 | Fletcher |
| 4,193,135 | A | | 3/1980 | Rhee |
| 4,249,507 | A | | 2/1981 | Marra |
| 4,257,386 | A | * | 3/1981 | Gazzara ..... 124/35.2 |
| 4,308,851 | A | | 1/1982 | Kaine, Jr. et al. |
| 4,316,443 | A | | 2/1982 | Giacomo |
| 4,392,475 | A | | 7/1983 | Fletcher |

(Continued)

*Primary Examiner*—John A. Ricci
(74) *Attorney, Agent, or Firm*—Gerald E. Helget; Briggs and Morgan, P.A.

(57) ABSTRACT

A caliper type bow string release includes a reversible trigger which is operable selectively in either the push fire mode or the pull fire mode. The caliper jaws of the release include automatic alignment and locking features. Movement of the string into the release mechanism engages the automatic locking mechanism and closes the release into a string retaining position until the release is fired by activation of the trigger. A complex cam surface is provided on the actuator for permitting incremental linear adjustment of the trigger force.

49 Claims, 4 Drawing Sheets

U.S. PATENT DOCUMENTS 4,403,594 A 9/1983 Todd
4,426,989 A 1/1984 Sutton
4,476,845 A 10/1984 Rickard
4,485,798 A 12/1984 Hamm
4,489,705 A 12/1984 Larson
4,509,497 A 4/1985 Garvison
4,567,875 A 2/1986 Fletcher
4,574,767 A 3/1986 Gazzara
4,584,983 A 4/1986 Ament
4,603,676 A 8/1986 Luoma
4,620,523 A 11/1986 Peck
4,625,705 A 12/1986 Willits
4,674,469 A 6/1987 Peck
4,691,683 A 9/1987 Peck
4,722,319 A 2/1988 Brady
4,831,997 A 5/1989 Greene
4,854,293 A 8/1989 Roberts
4,860,720 A 8/1989 Todd
4,881,516 A 11/1989 Peck
4,909,232 A 3/1990 Carella
4,926,835 A 5/1990 Peck
4,930,485 A 6/1990 Kopper
4,938,487 A 7/1990 Ponsart
4,949,698 A 8/1990 Burnham
4,969,448 A 11/1990 Beyer
4,981,128 A 1/1991 Garvison
4,982,718 A 1/1991 Hamm et al.
5,009,214 A * 4/1991 Wilde ..... 124/35.2
5,014,689 A 5/1991 Meunchen et al.
5,020,508 A 6/1991 Greene, Jr.
5,027,786 A 7/1991 Peck
5,067,472 A 11/1991 Vogel et al.
5,070,854 A * 12/1991 Peck ..... 124/35.2
5,076,251 A 12/1991 Peck
5,078,116 A 1/1992 Peck
5,103,796 A 4/1992 Peck
5,170,771 A * 12/1992 Peck ..... 124/35.2
5,261,581 A 11/1993 Harden, Sr.
5,263,466 A 11/1993 Peck
5,307,788 A 5/1994 Peck
5,417,197 A * 5/1995 Bankstahl ..... 124/35.2

* cited by examiner

FIG. 1
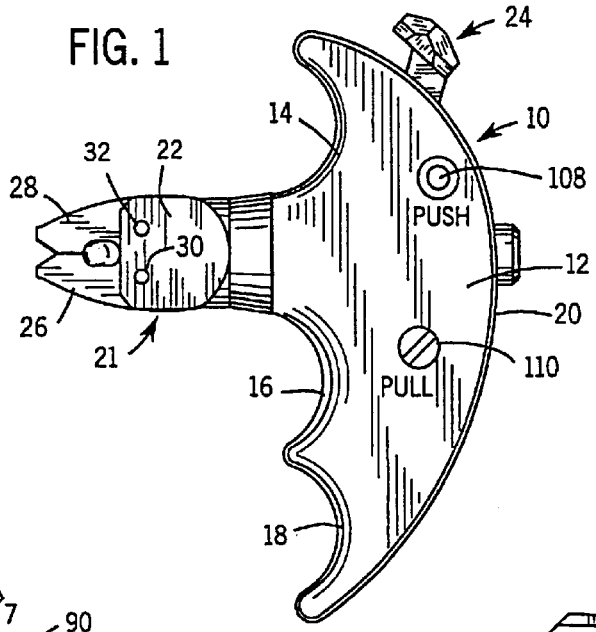
FIG.7
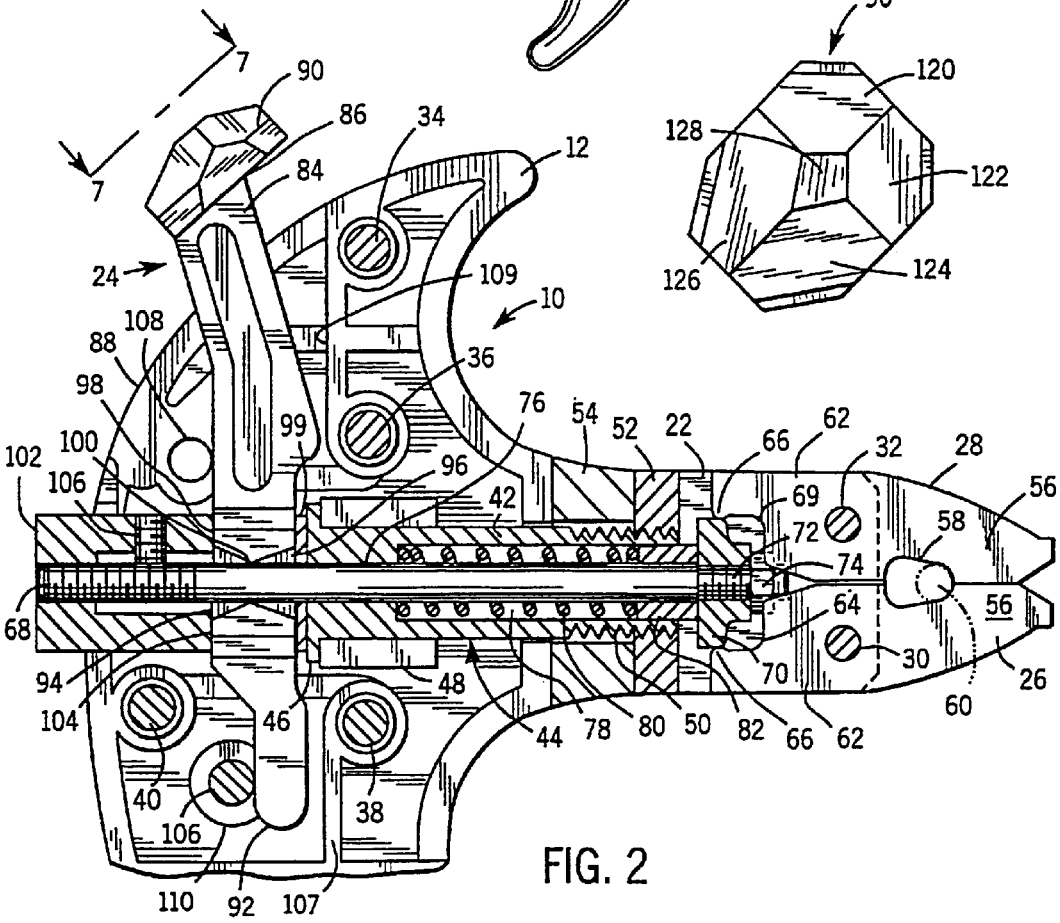
FIG. 2

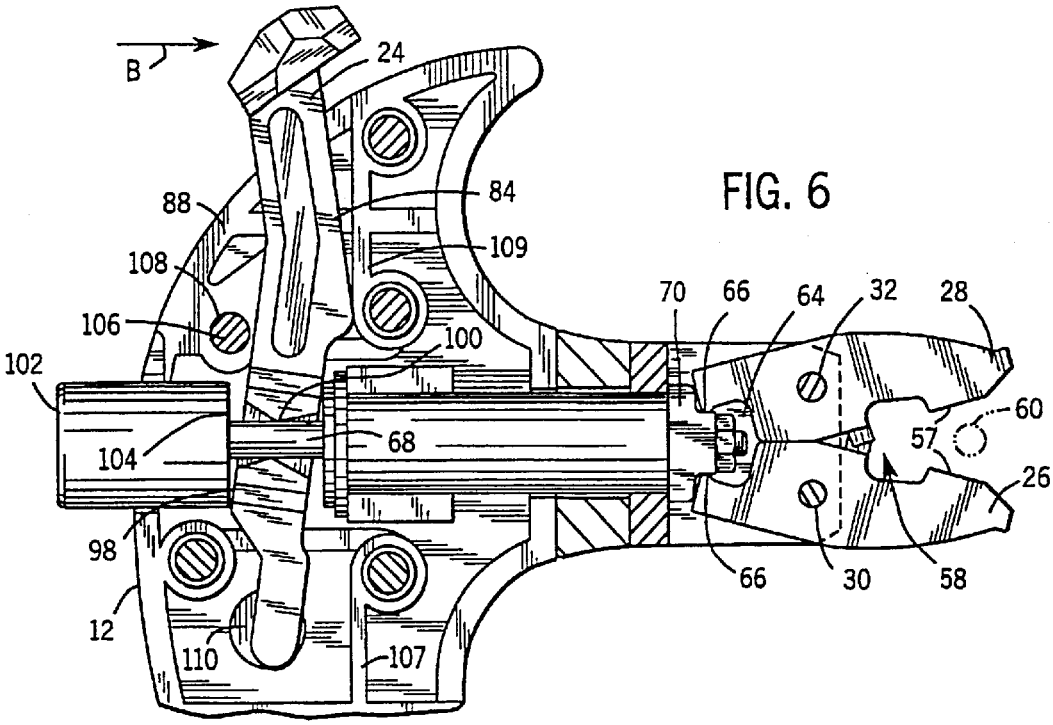
FIG. 6
FIG. 8
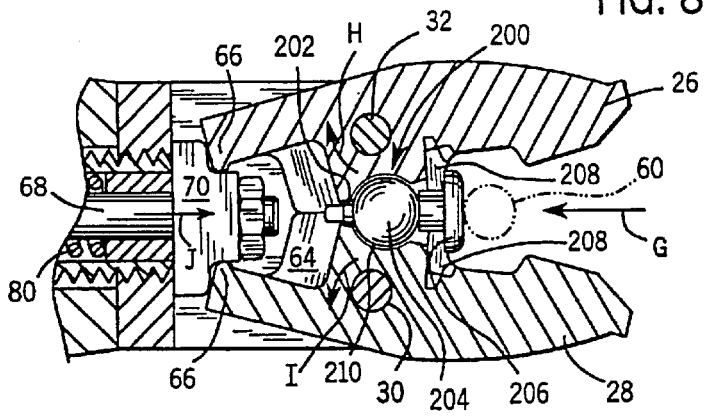
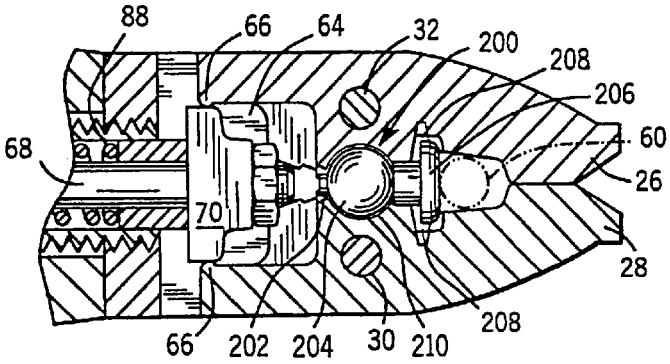
FIG. 9

CALIPER TYPE BOW STRING RELEASE HAVING PUSH/PULL TRIGGER AND AUTOMATIC ALIGNMENT AND LOCKING FEATURES

Matter enclosed in heavy brackets [ ] appears in the original patent but forms no part of this reissue specification; matter printed in italics indicates the additions made by reissue.

*This application is a continuation-in-part of U.S. patent application Ser. No. 07/979,106, filed Nov. 20, 1992, now U.S. Pat. No. 5,357,939.*

BACKGROUND OF INVENTION

1. Field of Invention

The subject invention is generally related to bow string releases of the type having a releasable sear for retaining a bow string, the sear including a pair of elements adapted for movement into and out of a closed position to retain the bow string and selectively release it. The invention is specifically directed to a caliper type bow string release having a reversible trigger and including both self-alignment and self-locking features.

2. Description of the Prior Art

Bow string releases have grown in popularity for target shooting and for hunting. A good release provides uniform release of the bow string and increases accuracy. The release is either hand held or strapped to the wrist and has a trigger which permits the archer to release the string. Typically, such devices employ a pivotable finger that engages the bow string. The finger or sear being movable to a release position for releasing the string. Releases of this type are illustrated in U.S. Pat. Nos. 4,066,060; 3,898,974; and 3,954,095.

It is also known to use ball or cylindrical elements in place of the finger to retain and release the string, wherein the elements are held by a head and retained in position by a yoke or sleeve. Devices of this type are shown in U.S. Pat. Nos. 4,403,594 and 5,263,466. While it is recognized that when the balls are separated by the tension of the string this provides minimal friction engagement and quiet release, there is still a strong preference for the caliper type jaw releases. One of the problems with the jaw releases is they are not self-locking and an independent action is required to lock the bow string in the sear mechanism after the string is released and upon reentry.

In addition, over the years two types of release trigger mechanisms have developed, depending on the preference of the archer. In the first, the release trigger is designed to release forward, where the trigger is pushed toward the bow during the fire stroke. There is also a preference by some archers that the release be a pull type trigger where the release is pulled in a rearward motion away from the bow in order to release the string. Further, most releases are designed to either more adequately accommodate a right-handed archer or a left-handed archer. In some cases, design changes have to be made in order to permit a specific configuration to be adapted from right-hand to left-hand use. While most releases accommodate such design changes, this greatly increases the manufacturing costs, increasing the ultimate end cost of the release to the user.

Therefore, there remains a need for a caliper type bow string release which is both self-locking and self-aligning. In addition, there is a need for a bow string release which is readily adaptable to either left-hand or right-hand use and would permit an archer to select between a push or pull fire mechanism.

SUMMARY OF THE INVENTION

The subject invention is a bow string release which is specifically designed to utilize the caliper jaw type sear mechanism while providing a self-locking and self-alignment feature. In addition, the release includes a calibration system permitting incremental adjustment of the trigger force, assuring accurate, consistent and predictable adjustment. The trigger mechanism is specifically designed to be selectively used in a push or a pull fire mode. The release is also designed to equally accommodate either left-handed or right-handed use.

In the preferred embodiment of the invention, the caliper of the trigger is carried in the housing or body of the release and has a movable select pin which can be positioned in a push mode or a pull mode. The select pin is specifically designed to assure that the trigger can only fire in one mode at a time, minimizing any risk of accidental firing in the non-selected mode. The trigger is also specifically designed to include an engagement pad which is ergonomically engineered to accommodate the archer's thumb or trigger finger in such a manner to permit an equal feel or a comfortable feel to the archer whether the release is used in a push fire mode, pull fire mode, or is used by either the left or the right hand.

The caliper jaws of the subject release are configured to operate as pivoting elements ball jaws having a interior notch area for holding the string rearwardly of the front end of the jaws, wherein pivotal motion of the jaws spreads the jaws to release the string through the forward end and from the string releasing notch. The rearward end of each jaw is specifically designed to include a cam follower for engaging a cam surface on a linear motion actuator which is moved in response to actuation by the trigger. The subject invention recognizes the fact that the non-linear forces in the jaw and the non-linear forces by the motion of the trigger have to be accommodated in the calibration and engagement surface in order to provide for linear, incremental adjustment of the trigger force. The calibration of the release mechanism specifically includes a non-linear, calibrated surface to account for the various forces on the release at various stages of its movement. The end result is a linear or incremental calibration adjustment mechanism which assures consistent, accurate and precise incremental adjustment of the trigger force on the release.

It is an important feature of the invention that the caliper-type jaw mechanism is self-aligning and self-locking. In the preferred embodiment, the mated jaws are identical to one another, and are in fact a common manufactured component. This greatly reduces the manufacturing costs while enhancing the design and repeatability characteristics of the release. In one embodiment, the alignment mechanism is provided by an arcuate alignment tab which is received in a concave arcuate alignment recess in the complementary mated jaw, assuring continuous contact between the two jaws at all points during their travel from the closed abutting locking position to the spread apart, release position. In addition, the jaws are provided with a string engaging self-locking tab which intercepts the string as it enters the notch area, engaging the jaw and forcing it closed as the string is properly seated in the release.

In a second disclosed embodiment, the alignment and locking mechanism comprises a spherical bearing element which is seated in a receptive recess or channel in the jaws to assure continuous contact and alignment of the jaws throughout movement during use of the release. In this embodiment, a head is positioned in communication with the spherical element for urging the spherical element in a rearward, closing movement as the string enters the notch and engages the head. This spherical bearing element is moved rearwardly in the jaw, causing the jaws to pivot about their pivot point from a spread apart open position to a closed, locking abutting position, for automatically locking the string in the notch area.

It is, therefore, an object and feature of the subject invention to provide a bow string release having a selective push fire or pull fire trigger.

It is another object and feature of the subject invention to provide a caliper type release having a self-aligning and self-locking mechanism.

It is yet another object and feature of the subject invention to provide a release having an incremental adjustment system by incorporating a non-linear actuator surface to accommodate and cancel out the non-linear force increments on the various moving parts of the string release.

It is further an object of the invention to provide a bow string release mechanism which easily accommodates both left-handed and right-handed archers.

Other objects and features of the invention will be readily apparent from the accompanying detailed drawing and description.

BRIEF DESCRIPTION OF THE DRAWINGS

FIG. 1 is a perspective view of a bow string release incorporating the features of the subject invention.

FIG. 2 is an enlarged, partial view of the release shown in FIG. 1, with the cover removed to expose the mechanism, and the release in the locked position.

FIG. 6 is a view similar to FIG. 5, illustrating the release in the forward fire mode.

FIG. 7 is a view looking in the direction of the arrows 7—7 of FIG. 2.

FIG. 8 is an enlarged, partial sectional view illustrating an alternative embodiment of the release jaws in the release position.

FIG. 9 is a view similar to FIG. 8, showing the jaws in the locked, string retaining position.

DETAILED DESCRIPTION OF THE PREFERRED EMBODIMENTS

Figure 3:
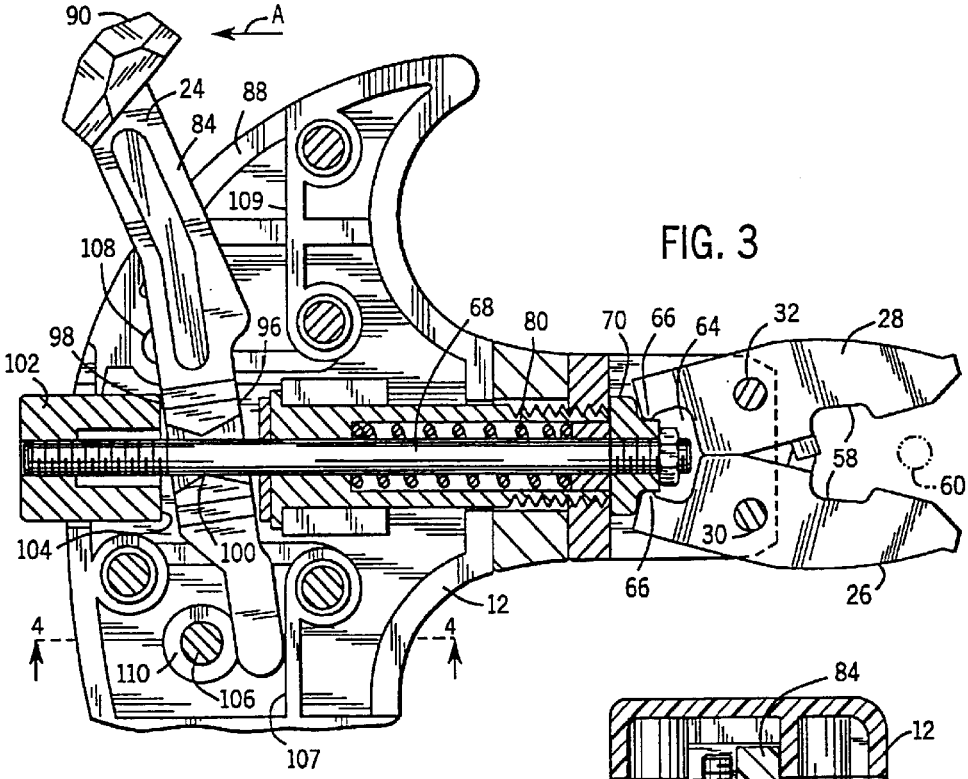
FIG. 3 is a view similar to FIG. 2, showing the release in the open, string releasing position, with the trigger in the rearward fire mode.
Figure 4:
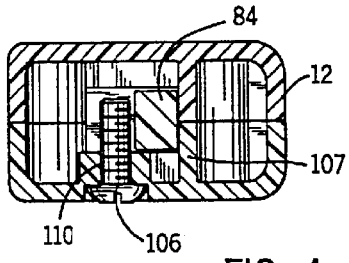
FIG. 4 is a sectional view taken along the line 4—4 of FIG. 3.

The string release of the subject invention is shown in FIG. 1 and is designated generally by the numeral 10. The release includes a body or housing 12 which is in the shape of a hand grip and includes finger receptive channels 14, 16, and 18, and convexly curved rear wall 20, permitting the release to be held comfortably in the palm of the hand with the index finger above the release jaw mechanism 22 in the channel 14 and the fore finger and ring finger in the channels 16 and 18, respectively. The trigger 24 is positioned to be engaged by the thumb. The jaw mechanism 21 includes a head or support surface 22 in which a pair of jaws 26 and 28 are pivotably mounted, as indicated by the pivot pins 30 and 32.

The string release mechanism of FIG. 1 is shown in FIGS. 2 through 7, in the reverse position, with the top half of the body or housing 12 and head 22 removed to expose the firing mechanism. As is typical, the housing 12 maybe of a molded construction with two mated halves adapted to be held together, typically by threaded screws as indicated at 34, 36, 38, and 40, see FIG. 2. In the preferred embodiment, the support surface or head 22 is secured to an elongated, hollow shaft 42 which is carried in a receptive recess 44 in the handle. The shaft 42 includes an enlarged head end 46 which is seated against a stop member 48 positioned in the recess 44. The right (as drawn) or opposite end 50 of the shaft is threaded for receiving a threaded coupling 52 which is secured to the support head 22. Typically, a spacer 54 is provided between the housing 12 and the threaded coupling 52.

The shaft 42 is rotatable in the body 12. This construction permits the head 22 to rotate 360° relative to the housing 12. The coupling 52 and head 22, respectively, are held on the rotatable shaft in the housing for defining the primary components of the bow string release. As is best seen in FIG. 2, the jaws 26 and 28 are pivotally mounted in the head 22 by pivot pins 30 and 32, respectively.

The bow string release mechanism of the type illustrated is a caliper-type release with a pair of opposed, functioning jaws 26 and 28. The forward end 56 of each jaw is designed to close into abutting engagement with one another, as shown in FIG. 2, with a string receptive notch 58 positioned behind the forward end 56, and of a dimension large enough to accommodate a standard bow string 60, as illustrated in phantom. The rearward end 62 of each jaw includes an actuator receptive clearance or recess 64 and an actuator engaging element 66 which, in the preferred embodiment, serves as a cam follower for the cam actuator of the subject invention, as will be described.

In the embodiment illustrated, the actuator comprises an elongated actuator rod 68 which extends through the housing 12 and the axial bore 76 hollow shaft 42. The rod 68 includes a cam actuator 70 mounted on the forward end. In the preferred embodiment, the forward end 72 of the actuator rod is of a reduced diameter and is threaded, whereby the cam actuator 70 maybe held in position on the end of the rod by means of a threaded fastener such as the, by way of example, the nut 74. As shown, the support shaft 42 includes an enlarged hollow cavity 78 along the axial bore 76 for defining a chamber for seating a biasing element such as the compression spring 80. A spring stop 82 is provided on the forward end of the rod 68, behind the cam actuator 70 for securing the spring 80 in the spring chamber. The spring acts to urge the actuator shaft 68 and the cam 70 toward the jaws, whereby the cam 70 is urged into engagement with the cam followers 66 of the jaws 26 and 28 to lock the jaws in the closed position, as shown in FIG. 2.

In the preferred embodiment of the invention, the trigger 24 includes an elongated stem 84 having an upper end 86 which projects through a slot 88 provided in the housing 12. An engagement pad 90 is provided on the upper end 86 and is adapted for accommodating the thumb of the archer to facilitate firing of the release. The opposite lower end 92 of the stem is positioned in the housing and serves as a stop for limiting the motion of the trigger, as will be explained.

In the preferred embodiment, the trigger includes a through channel 94 which is adapted for receiving the actuator rod 68. As shown, the outer side edges 96 (forward) and 98 (rearward) of the channel are larger than the central portion 100. In the preferred embodiment in the channel is a double v, providing a continuous line engagement point 100, where the trigger is in engagement with the rod 68. This permits the trigger to rock back and forth on the rod. A trigger engaging element 102 is mounted on the rearward end of the rod 68 and includes a forward surface 104 adapted to engage the rearward edge 98 of the trigger stem. In the preferred embodiment, the rear end 60 of the rod 68 is threaded and the trigger engagement element 102 is tapped to be threadably received on the rod. This permits a fine adjustment of the axial position of element 102 relative to the rod 68 to control the trigger fire force. A set screw 106 is provided to lock the trigger engaging element in position on the shaft to assure accurate and fixed adjustment of the trigger stroke. A cushioned element may be provided between the forward edge 96 of the trigger stem and the head 46 of the shaft 42.

Figure 5:
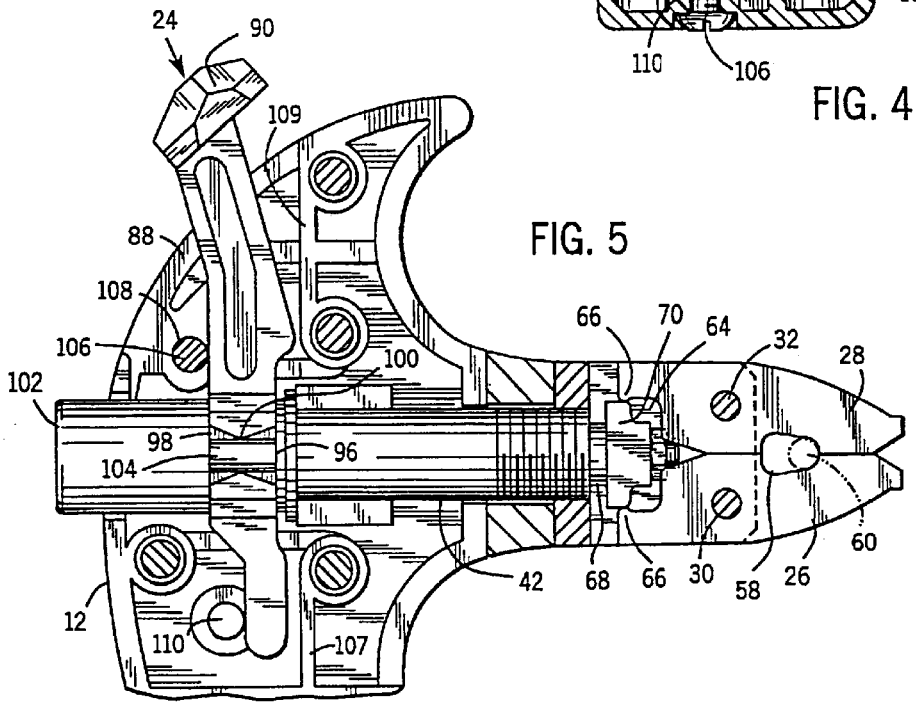
FIG. 5 is a view similar to FIG. 2, illustrating the trigger in the forward firing mode, with the release in the locked position.

It is an important feature of the subject invention that the trigger 24 is adapted to be fired in either the rearward or "pull" direction, indicated by arrow A in FIG. 3 or the forward "push" direction, as indicated by the arrow B in FIG. 6. Conceptually, this is accomplished by moving the stop element of the trigger 24, to alter the functional motion of the trigger from a forward acting position to a rearward acting position. In the preferred embodiment, a selector element such as the screw 106 (see FIG. 4) may be positioned in one of two receptive tapped holes 108 and 110, as indicated in FIGS. 1, 2, and 5. Specifically, the housing 12 includes an upper (as drawn) selector position defined by hole 108 and a lower selector position as defined by hole 110.

When the selector screw 106 is in the hole 110, as shown in FIGS. 1–4, the trigger is designed to function in a rearward motion or in a "pull" mode. Specifically, the lower end 92 of trigger stem 84 is an engagement with the screw 106 (see FIGS. 2 and 3). When the trigger is moved from the neutral position of FIG. 2 in a rearward direction, as indicated by arrow A in FIG. 3, the trigger rocks back on rod 68, causing the lower end 92 of the trigger stem to move forward from screw 106 toward the wall 107 of the housing, causing the trigger to rock backward at point 100 and permitting the back wall 98 of the stem to engage the front wall 94 of the trigger engagement member 102, causing shaft 68 to move to the left, as drawn. This draws the cam 70 out of engagement with the cam followers 66 on the jaws 26 and 28, permitting the pull force on the bow string 60 to force open the jaws 26 and 28, as shown in FIG. 3, for releasing the string.

In order to fire the trigger in a forward acting or "push" mode, as shown in FIGS. 5 and 6, the selector screw 106 is removed from hole 110 and placed in hole 108, as shown. In this mode, the trigger is adapted to move in a forward direction, whereby the trigger moves between the screw 106 and the wall 109 of the housing, see FIGS. 5 and 6, causing the trigger to rock on the shaft and permitting the lower side of the channel wall 98 to engage the trigger engaging element 102 on the rod 68, forcing the rod to move rearwardly or to the left, as drawn, permitting the cam 70 to disengage from the cam followers 66 on the jaws. This permits the string force on the bow string to force open the jaws 26 and 28, as shown in FIG. 6, to release the string.

In the preferred embodiment of the invention, the trigger is specifically designed to comfortably accommodate a left handed or right handed archer. In this regard, the engagement pad 90 on the top end 86 of stem 84 is specifically designed to provide a consistent feel for left, right, push and pull modes. Specifically, the engagement pad is ergonomically structured to equally accommodate either a left handed or a right handed archer. As is specifically shown in FIGS. 2 and 7, the contacting surface of the engagement pad is multi-faceted and includes a plurality of angled surfaces 120, 122, 124, 126 and 128. The primary surfaces 120, 122, 124, and 126 have a projected intersection at a common point which is substantially along the axis of the trigger stem 84. In the preferred embodiment, each of these surfaces are truncated near the intersection to form a flat upper surface 128 which is diamond in shape. Each of the surfaces 120, 122, 124, and 126 intersect the projected axis of stem 84 at an inclined angle to provide a gripping surface for the thumb. The four primary surfaces 120, 122, 124, and 126 equally accommodate either the left or the right handed archer. These primary surfaces or facets enable comfortable secure operation of the trigger in either a "push" or "pull" fire mode. While the four primary facets are used on the preferred embodiment of the trigger, it will be readily understood that this multi-faceted trigger can also be constructed with three to five or more primary facets and still provide an improvement over prior art flat or round trigger styles. The primary facets are supported by secondary facets or chamfers and radii, at the intersecting lines between the surfaces to present a comfortable thumb operating and thumb engaging surface when fully engaging the trigger to load and cycle the bow string release mechanism. It will be readily understood that the primary facets may not be flat surfaces but may be ribbed or knurled to increase the friction between the thumb and the trigger. Also, a slightly concave or convected surface may be utilized for comfort.

Another important aspect of the subject invention is the cam follower and cam release actuator mechanism. Specifically, the cam 70 and cam followers 66 on the jaws 26 and 28 are designed to provide an incremental adjustment of the trigger force in relation to the adjustment of the trigger stroke by calibration of the trigger engaging element 102, whereby the force required to fire the mechanism by movement of the trigger 24 is adjusted. This is an important advance over the prior art since the proportional cam mechanism permits incremental and predictable change in the force needed to operate the trigger when firing the release in a one-to-one or equal incremental relationship to change in the trigger adjustment mechanism defined by the trigger engaging element 106 and the actuator rod 68.

Also, by understanding the importance of the shape of the cam surface, specific customized adjustment features may be designed to permit different rates of change to be built into the adjustment mechanism. This has several advantages over the prior art adjustable releases. For example, for low trigger force levels say, 1 to 4 ounces, one increment of movement of the adjustment mechanism should produce an increase of one ounce of trigger force. That is, equal angular repositioning of the threaded element 102 along the shaft 68 will result in equal adjustments in the trigger force. By way of example, one turn would result in a one ounce adjustment in trigger force. This linear or incremental adjustment is accomplished by understanding that a nonlinear or proportionally cam surface 70 is required. This proportionality not only reduces the number of attempts made by trial and error to achieve a specific trigger force, it also reduces the potential for overshooting an adjustment and putting a release in a marginal or unsafe condition.

By understanding the relationship between the nonlinear or proportional cam surface 70 and the linear incremental adjustment of the trigger, it is also possible to design a calibrating mechanism utilizing progressively increasing increment rates for higher adjustments. For example, a four ounce trigger setting may be achieved using one increment per ounce change in trigger force representing 25% change in trigger force. At 20 ounces the same increment represents only a 5% change in the trigger force. If the release is adjusted for a low trigger force many adjustment increments are required in order to reach the 30 ounce range. If the increment rate is high then fewer adjustment increments are required to move from a lower force setting to a higher force setting, but the force changes at the low end of the range increment are very large. Therefore, it is desirable to have a low or flat rate of change at the low end of the range so finer adjustments can be made, while at the upper end of the range the rate of response to adjustment input should be greater. The proportional trigger mechanism of the subject invention allows any number of rates or continuously variable rates to be built in by recognizing the importance of the shape of the cam surface 70. The end result is a trigger adjustment mechanism which provides for a proportional and consistent adjustment, which is quicker and easier to use with less travel at higher trigger force levels and with a wider range of adjustment for lower trigger force levels, with predictable results.

The method of calibrating the trigger takes into consideration all of the forces encountered in the release to define a direct relationship between the trigger 24, cam 70 and the cam followers 66. By keeping the radius on the follower cam as small as possible, the contact point between the cam and the cam follower is minimized and has a minimum effect on the trigger force. The coefficient of friction between the cam and cam follower is also monitored and is, of course, determined by the material used for the cam and the jaws as well as the finish. The precise shape of the cam surface can be developed using a trial and error basis, by determining the various relationships developed for each setting of the trigger. Of course, there is a defined mathematical model for this, as well. In the preferred embodiment, the cam surface was calculated by mathematical modeling. In order to accurately determine the trigger force utilizing the calibration mechanism of the subject invention, the following relationships apply:

$$\cos C = \frac{(\cos(90 - C) \times A) + Fs((\sin(90 - C \times A) + (\sin A \times G))}{G}$$

$$\tan C = \frac{[G - FsA]}{[A + FsG]} \text{ when contact angle adds to load on trigger pull pin}$$

$$\tan C = \frac{[FsA + G]}{[A - FsG]} \text{ when contact angle subtracts from load on trigger pull pin}$$

$$Tf = \frac{G + S}{MA}$$

where:

C=contact angle between cam and cam follower sear elements

A=two times the force on a follower

Fs=coefficient of friction static on cam and followers

G=force on trigger pull pin due to loading and Fs

S=force applied by the return spring

MA=mechanical advantage of the trigger lever

Tf=trigger force required to fire the release.

As will be noted from the above, the subject invention provides a unique, consistent and predictable mechanism and method for adjusting the trigger force for the string release utilizing the caliper type jaws, a cam surface actuator and radiused cam follower, as shown in the drawings.

The bow string release mechanism of the subject invention may incorporate the jaws as shown in FIGS. 1–6, or the alternative embodiments shown in FIGS. 8 and 9 or 10–12. The configurations of FIGS. 8–12 provide automatic alignment and latching for latching the release onto a bow string and for retaining it in the string retaining notch 58 by simply placing the string in the jaw and engaging the automatic mechanism. Specifically, the automatic synchronizing and latching mechanisms provide three functions, as follows:

1. jaw synchronization;
2. a reduction in the relative movement between jaws while in the latched position; and
3. a resetting means to latch the release in the latched or locked position for holding the bow string in the release.

Figure 10:
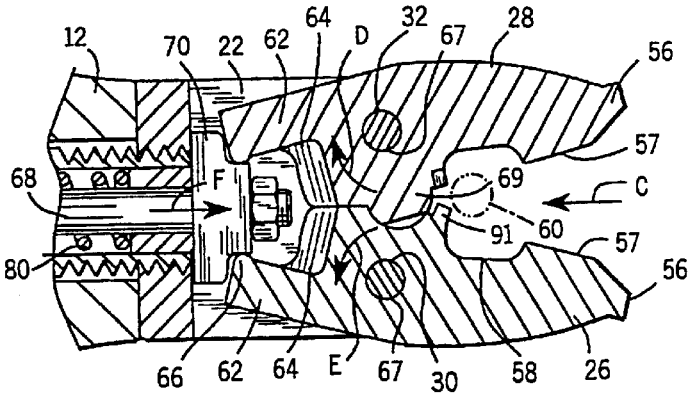
FIG. 10 is an enlarged, partial sectional view of a second alternative jaw configuration in the release position.
Figure 11:
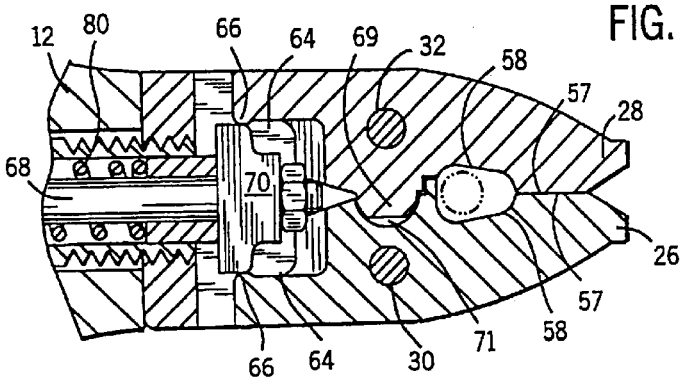
FIG. 11 is a view similar to FIG. 10, showing the jaws of FIG. 10 in the locked, string retaining position.
Figure 12:
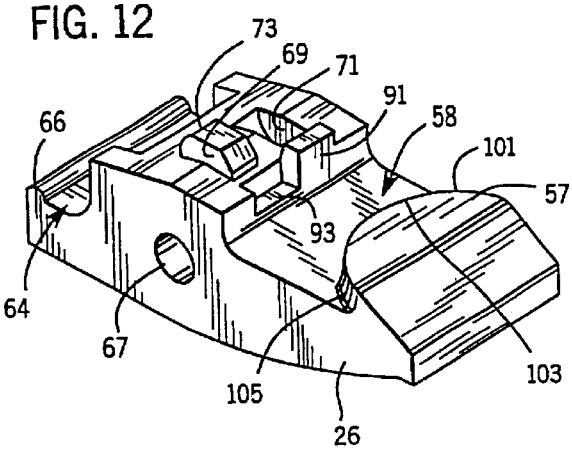
FIG. 12 is a perspective view of one of the jaws shown in FIGS. 10 and 11.

In the first automatic synchronization and latching embodiment, which is shown in FIGS. 10–12, each jaw 26 and 28 includes a forward end 56, and abutment surface 57, a string retaining notch 58, a rearward end 62, an actuator receptive recess 64, a cam follower 66 and a pivot point defined by the through hole 67. As shown, the pivot point defined by the through hole 67 is positioned intermediately of the forward end 56 and the rearward end 62 in the central body portion of each jaw. In the illustrated embodiment, each jaw further includes an arcuate synchronizing tab 69 projecting radially outward from the center point of the pivot hole and adapted to be received in a concave arcuate recess 71 in the complementary jaw (see FIG. 12).

In the preferred embodiment, each of the jaws 26 and 28 are identical and when positioned in the abutted mated relationship shown in the drawings, the arcuate tab 69 and concave recess 71 are in an over/under position, providing a dual, over/under alignment feature between the two mated jaws 26 and 28. As better seen in FIG. 11, it will be noted that the diametric center of each arcuate tab is positioned on a straight line with the centers of the pivot points 67 when the jaws are in the closed, locked position. Where desired, the arcuate tab 69 may have a flat outer surface 73 to provide additional clearance between the jaws and facilitate fluid movement of the jaws between the latched closed position of FIG. 11 and the opened position of FIG. 10.

The arcuate synchronization tab 69 and complementary recess 71 provide synchronized movement of the two jaws when they are mounted in the head or support member 22, by assuming that they move together through the interrelationship of the tab 69 and recess 71. This provides an inexpensive synchronizing system by relieving the required tolerance limits on the pivot pins 30 and 32 and the pivot holes 67.

Figure 10A:
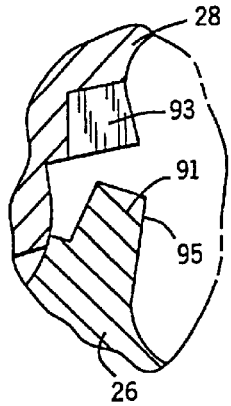
FIG. 10a is a enlarged fragmentary view of a portion of FIG. 10.
Figure 11A:
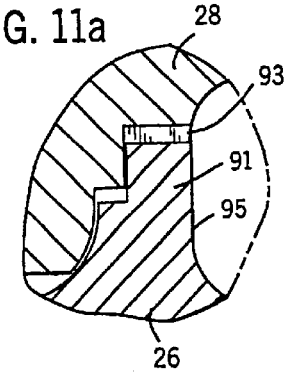
FIG. 11a is an enlarged fragmentary view of a portion of FIG. 11.

In the embodiment of FIGS. 10 and 12, the jaw also includes an automatic latching feature as defined by the latch tab 91 provided on each jaw and the complementary latch receptive seat 93 (see FIG. 12). In the preferred embodiment the latch tab 91 of each jaw is disposed offset from the synchronizing tab 69, to prevent movement of the jaws relative to one another when closed. As with the synchronizing tabs 69, the latch tabs 91 are positioned in an over/under relationship when the jaws are mounted in complementary mated position on the support head 22, as illustrated in FIGS. 10 and 11. The latching tab 91 is adapted to intercept the bow string 60 as the bow string is introduced into the notch area 58, as indicated by the arrow C of FIG. 10. As better illustrated in FIGS. 10a and 11a the string 60 engages forward surface 95 of each latching tab 91 and forces the tab rearward (or to the left, as drawn), and ultimately into the position of FIGS. 11 and 11a. As this occurs, the rearward ends 62 of the jaws 26, 28 spread, permitting cam 70 to enter the cam receptive recess 64. This permits the spring 80 to advance the actuator rod shaft 68 forward as indicated by arrow F, further advancing the cam actuator 70 into the recesses 64, whereby the cam engages the cam followers 66 and locks the jaws in abutting relationship along abutment surfaces 57 of the jaws to lock the string in the notch area 58 and retain the release in the closed, locked position.

An alternative embodiment for the synchronizing and latching mechanism is shown in FIGS. 8 and 9. Specifically, the general configuration of the jaws 26 and 28 is essentially the same that shown in FIGS. 10–12. However, as shown in FIGS. 8 and 9, the synchronizing tabs 69 and recesses 71, as well as the latching tabs 91 and latching recesses 93 have been replaced by a synchronizing and latching assembly 200. As shown in FIGS. 8 and 9, the assembly 200 comprises an elongated shaft or pin 202, a spherical bearing 204 and a button "mushroom" head 206 on one end of the pin 202. In the illustrated embodiment, each of the jaws 26 and 28 have been modified to include an enlarged recess 208 for accommodating the button head 206 when the jaws are both in the opened position of FIG. 8 and the closed position of FIG. 9.

In addition, the synchronizing recesses 71 and tabs 69 have been deleted and replaced by a cylindrical or arcuate recess 210 adapted to accommodate the spherical bearing 204. The latching and synchronizing mechanism 200 operates in substantially the same manner as the synchronizing tabs 69 and latching tabs 91 of the configuration shown in FIGS. 10 and 12. Specifically, the spherical bearing 204 is functional to provided precise synchronizing of the jaws 26 and 28 when in the assembled relationship shown in FIGS. 8 and 9. The string 60 activates the latching mechanism in a manner similar to the activation of the latching tabs 91, wherein the string is urged against the button head 206 when entered into the notch areas 58 of the jaws in the direction of arrow G. By placing the string against the button head 206, the button head is urged rearwardly (or to the left, as drawn), forcing the spherical portion rearwardly as well, causing the jaws to rotate in the directions of arrows H and I (FIG. 8), and causing the rear portions 62 of the jaws to spread. For permitting the spring 80 to advance the shaft 68 in the direction of arrow J, forcing the cam 70 into engagement with the cam followers 66, and locking the bow string in the closed and locked position of FIG. 9.

It will be readily understood that the synchronizing and latching assembly 200 may be made by a variety of manufacturing methods, and may be a single molded piece comprising the pin 202, the spherical bearing 204 and the button head 206, or each component may be independently manufactured and assembled.

Another important feature of the jaw configuration of the subject invention is the shape of the string engaging surface 101 of the abutment portions 57. As more clearly shown in FIG. 12, the string engaging surface 101 is convexly, arcuately shaped in a direction parallel to the axis of the bow string, to accommodate the string shape as it is pulled back from the bow. In addition, it will be noted that the elongated arcuate surface 103 of the string engaging portion 101 is concavely curved as indicated at 105 to accommodate the periphery of the string. When the two jaws 26 and 28 are positioned in mated locked condition, the arcuately concaved curved portions 105 form a surface which is substantially the same shape as the bow string periphery (or circular). This eliminates the tendency of the bow string release to pinch or crease the bow string when it is in the pulled position, greatly enhancing the life of the bow string by reducing wear and tear and possible fatigue failure at the release engaging area.

While certain features and embodiments of the invention have been described in detail herein, it will be readily understood that the subject invention includes all modifications and enhancements within the scope and spirit of the following claims.

What is claimed is:

1. A bow string release mechanism having a housing and a two-way trigger mounted in the housing, a sear assembly for selectively holding a bow string and for releasing the bow string upon actuation of the trigger, the bow string release mechanism including an actuator movable between a sear locking position and a sear releasing position for permitting movement of the sear assembly between a closed, string retaining position and an opened, string releasing position, respectively, and said trigger for controlling the actuator, the trigger and actuator being carried in the housing, the trigger further comprising:

a. an elongated stem having one end extending outwardly of the housing and an opposite end;

b. an actuator engaging element on the stem, wherein the actuator engaging element is positioned on the stem intermediately of the opposite stem ends, and wherein the stem is adapted for rocking movement relative to the actuator engaging element; and c. a mount for mounting the stem and the actuator engaging element for relative movement with respect to the housing in both a forward and a reverse direction, the actuator being responsive to each movement for activating the sear assembly to permit movement of the sear assembly from the closed, string retaining position to the opened, string releasing position:

d. wherein the actuator comprises a shaft mounted for axial movement relative to the housing and wherein the actuator engaging element is a through channel in the trigger stem and adapted for receiving the actuator shaft, the through channel having opposite outer edges disposed in axially spaced apart relationship along the axis of the actuator shaft, the through channel further including a shaft engaging element intermediately of the opposite outer edges, the channel opening at the outer edges being of a larger opening than the clearance between the shaft and the shaft engaging element, whereby the trigger stem is adapted to rock in a forward and reverse direction about the shaft in a plane of the axis of the shaft.

2. The release mechanism of claim 1, wherein the channel is wider at the outside edges and narrower therebetween to form a double V.

3. The release mechanism of claim 1, further comprising a selector associated with the trigger stem for selectively restricting the trigger stem movement to either the forward or the reverse direction, the selector including means for selectively restricting the rocking action of the trigger stem relative to the actuator shaft to either a forward action or a reverse action.

4. The release mechanism of claim 3, the shaft further including an abutment in communication with the trigger stem, whereby rocking movement of the trigger stem advances the trigger stem toward the abutment and generates axial movement of the actuator shaft.

5. The release mechanism of claim 4, wherein the selector further includes a stop member adapted to be selectively positioned in abutting engagement with the trigger stem either between the through channel and said one stem end or between the through channel and said other stem end, whereby the stem movements is limited by the stop for permitting the actuator to rock relative to the shaft for engaging the abutment and axially moving the shaft.

6. The release mechanism of claim 4, further including means for adjusting the position of the abutment relative to the shaft for controlling the rocking stroke of the trigger stem.

7. A bow string release mechanism having a sear assembly including a pair of pivotable jaws having a string retaining notch therein for selectively holding a bow string and for releasing the bow string upon actuation of a trigger, the bow string release mechanism including an actuator shaft movable between a jaw engaging and locking position and a jaw disengaging and releasing position for permitting movement of the jaws between an abutting, closed, string retaining position and a separated, opened, string releasing position, respectively, and a trigger for controlling the position of the actuator shaft, the trigger mounted in a housing including a handle portion adapted to be placed in the palm of the hand and gripped by the fingers with the trigger adapted to be engaged by the thumb, the trigger comprising:

a. an elongated stem having one end extending outwardly of the housing;

b. an actuator engaging element on the stem;

c. a mount for mounting the stem and the actuator engaging element for relative movement with respect to the housing in both a forward and a reverse direction, the actuator being responsive to each movement for activating the sear assembly to permit movement of the sear jaws from the abutting, closed, string retaining, position to the separated, opened, string releasing, position; and d. a selector associated with the trigger for selectively restricting the trigger movement to either the forward or the reverse direction, when engaged by the thumb.

8. The release mechanism of claim 7, wherein the actuator shaft is mounted for axial movement relative to the housing and wherein the actuator engaging element is a through channel in the trigger stem and adapted for receiving the actuator shaft, the through channel having opposite outer edges disposed in axially spaced apart relationship along the axis of the actuator shaft, the through channel further including a shaft engaging element intermediately of the opposite outer edges, the channel opening at the outer edges being of a larger opening than the clearance between the shaft and the shaft engaging element, whereby the trigger stem is adapted to rock in a forward and a reverse direction about the shaft in a plane of the axis of the shaft, the shaft further including an abutment in communication with the trigger stem, whereby rocking movement of the trigger stem advances the trigger stem toward the abutment and generates axial movement of the actuator shaft.

9. The release mechanism of claim 8, the selector further comprising means for selectively restricting the rocking action of the trigger stem relative to the actuator shaft to either a forward action or a reverse action, and a stop member adapted to be selectively positioned in abutting engagement with the trigger stem either between the through channel and said one stem end or between the through channel and said other stem end, whereby the stem pivots about the stop for permitting the actuator to rock relative to the shaft for engaging the abutment and axially moving the shaft.

10. The release mechanism of claim 8, wherein the channel is wider at the outside edges and narrower therebetween to form a double V.

11. The release mechanism of claim 10, wherein including means for adjusting the position of the abutment relative to the shaft for controlling the rocking stroke of the trigger stem.

12. The release mechanism of claim 11, further including biasing means associated with the actuator for urging the actuator into a position for maintaining the sear assembly in the closed position.

13. The release mechanism of claim 12, wherein the sear jaws are mounted for full rotation relative to the housing.

14. A bow string release mechanism having a sear assembly movable between a closed, string retaining position and an opened, string releasing position, an actuator associated with the sear assembly for selectively engaging and maintaining the sear assembly in the closed, string retaining, position, the actuator responsive to a movable trigger to disengage the sear assembly and permit the sear assembly to move from the closed, string retaining, position to the opened, string releasing, position, the sear assembly comprising:

a. a support element;

b. a pair of opposed jaws pivotably mounted on the support element and adapted for pivotal movement into and out of abutting engagement with one another, each jaw having opposite outer ends, a forward end of the jaws including a string retaining notch which is closed for holding a string when the jaws are in abutting engagement and which is opened for releasing the string when the jaws are separated;

c. a rearward end of each jaw adapted for receiving the actuator for holding the jaws in the abutting, closed, string retaining, position;

d. the pivot point of each jaw being positioned intermediately of the opposite outer ends;

e. each jaw having a string receptive notch intermediately of the forward end of the jaw and the pivot point; and f. one jaw including a tab projecting outwardly from the notch toward the opposing jaw and a tab-receptive socket in said other jaw for receiving the tab of the opposing jaw to assure alignment of the jaws when in the abutting, closed position.

15. The release mechanism of claim 14, wherein each jaw has a tab and a tab-receptive socket for the opposing jaw.

16. The release mechanism of claim 15, wherein said bearing means is an integral element on the jaws and comprises a projecting, arcuate bearing member on one jaw and a complementary arcuate, recessed channel in the opposite jaw.

17. The release mechanism of claim 16, wherein the center of the arcuate bearing member and the pivot points of the opposed jaws define a straight line when the jaws are in the closed position.

18. The release mechanism of claim 17, wherein each jaw includes an arcuate bearing member and a complementary arcuate, recessed channel for receiving the arcuate bearing member of the opposing jaw.

19. The release mechanism of claim 14, wherein each jaw further includes bearing means for assuring smooth, substantially simultaneous action of the jaws as they move from the closed, string retaining, position to the opened, string releasing, position.

20. A bow string release mechanism having a sear assembly movable between a closed, string retaining position and an opened string releasing position, an actuator associated with the sear assembly for selectively engaging and maintaining the sear assembly in the closed position, the actuator responsive to a movable trigger to disengage the sear assembly and permit the sear assembly to move from the closed string retaining position to the opened string releasing position, the sear assembly comprising:

a. a support element;

b. a pair of opposed jaws mounted on the support element for pivotal movement into and out of abutting engagement with one another, each jaw having opposite outer ends, a forward end of the jaws including a string retaining notch which is closed for holding a string when the jaws are in abutting engagement and which is opened for releasing the string when the jaws are separated;

c. a rearward end of each jaw adapted for receiving the actuator for holding the jaws in the abutting, closed position;

d. the pivot point of each jaw being positioned intermediately of the opposite outer ends;

e. each jaw having a string receptive notch intermediately of the forward end of the jaw and the pivot point;

f. the string retaining notch of each jaw including a string engaging surface which is contoured to conform substantially to the outer periphery of the string when the jaws are in the closed position.

21. The release mechanism of claim 20, wherein the string engaging surface is contoured in both the radial and axial directions of the string.

22. The release mechanism of claim 21, wherein the radial contour is a concave surface.

23. The release mechanism of claim 21, wherein the axial contour is a convex surface.

24. A bow string release mechanism having a sear assembly movable between a closed, string retaining position and an opened, string releasing position, an actuator associated with the sear assembly for selectively engaging and maintaining the sear assembly in the closed, string retaining, position, the actuator responsive to a movable trigger to disengage the sear assembly and permit the sear assembly to move from the closed, string retaining, position to the opened, string releasing, position, the sear assembly comprising:

a. an actuator engaging element on the sear assembly; and b. the actuator having an adjustment surface which is selectively movable into and out of contact with the actuator engaging element in response to actuation of the actuator by the trigger, the adjustment surface being positionally adjustable relative to the actuator engaging element for calibrating the stroke required to release the string by actuation through the trigger, the adjustment surface being proportional to trigger movement such that an incremental change in position results in a predictable change in trigger stroke.

25. The release mechanism of claim 24, wherein the adjustment surface intercepts the axis of motion of the actuator at an inclined angle.

26. The release mechanism of claim 25, wherein the angular relationship between the adjustment surface and the actuator axis is progressively changing along the length of the adjustment surface.

27. The release mechanism of claim 26, wherein each angular portion of the adjustment surface is a linear element.

28. The release mechanism of claim 26, wherein the adjustment surface is a continuous curved surface.

29. The release mechanism of claim 26, wherein the adjustment surface defines a cam and the actuator element comprises a cam follower for engaging the cam, the actuator further including a biasing element for normally urging the actuator into engagement with the cam follower for maintaining the sear assembly in the closed, string retaining position, the trigger including a lever for applying a force to the actuator.

30. The release mechanism of claim 27, wherein the sear assembly further comprises:

a. a pair of opposed jaws mounted for pivotal movement into and out of abutting engagement with one another wherein the jaws are in a closed, string retaining, position when in abutting engagement and an open, string releasing, position when not in abutting engagement, each jaw having opposite outer ends, a forward end of the jaws including a string retaining notch which is closed for holding a string when the jaws are in abutting engagement and which is opened for releasing the string when the jaws are separated;

b. a rearward end of each jaw adapted for receiving the actuator for holding the jaws in the closed, string retaining, position;

c. the pivot point of each jaw being positioned intermediately of the opposite outer ends; and d. each jaw having a string receptive notch intermediately of the forward end of the jaw and the pivot point.

31. A bow string release mechanism having a sear assembly movable between a closed, string retaining position and an opened, string releasing position, an actuator associated with the sear assembly for selectively engaging and maintaining the sear assembly in the closed, string retaining, position, the actuator responsive to a movable trigger to disengage the sear assembly and permit the sear assembly to move from the closed, string retaining, position to the opened, string releasing position, the sear assembly comprising:

a. a support element;

b. a pair of opposed jaws mounted on the support element for pivotal movement into and out of abutting engagement with one another, each jaw having opposite outer ends, a forward end of the jaws including a string retaining notch which is closed for holding a string when the jaws are in abutting engagement and which is opened for releasing the string when the jaws are separated;

c. a rearward end of each jaw adapted for receiving the actuator for holding the jaws in the abutting, closed position;

d. the pivot point of each jaw being positioned intermediately of the opposite outer ends;

e. a string retaining notch in each jaw intermediately of the forward end of the jaw and the pivot point;

f. the actuator having a jaw engaging adjustment surface which is selectively movable into and out of contact with the jaw in response to actuation of the actuator by the trigger, the adjustment surface being positionally adjustable relative to the jaw for calibrating the stroke required to release the string by actuation through the trigger, the adjustment surface being proportional to trigger movement such that an incremental change in position results in an incremental change in trigger stroke.

32. The release mechanism of claim 31, wherein the adjustment surface intercepts the axis of motion of the actuator at an inclined angle.

33. The release mechanism of claim 32, wherein the angular relationship between the adjustment surface and the actuator axis is progressively changing along the length of the adjustment surface.

34. The release mechanism of claim 33, wherein each angular portion of the adjustment surface is a linear element.

35. The release mechanism of claim 33, wherein the adjustment surface is a continuous curved surface.

36. The release mechanism of claim 33, wherein the adjustment surface defines a cam and each jaw includes a cam follower element for engaging the cam, the actuator further including a biasing element for normally urging the actuator into engagement with the jaws and for maintaining the jaws in the closed, string retaining position, the trigger including a lever for applying a force to the actuator.

37. The release mechanism of claim 36, wherein the trigger force required to fire the release is determined by the following formula:

$$\cos C = \frac{(\cos(90 - C) \times A) + Fs((\sin(90 - C \times A) + (\sin A \times G))}{G}$$

$$\tan C = \frac{[G - FsA]}{[A + FsG]} \text{ when contact angle adds to load on trigger pull pin}$$

$$\tan C = \frac{[FsA + G]}{[A - FsG]} \text{ when contact angle subtracts from load on trigger pull pin}$$

$$Tf = \frac{G + S}{MA}$$

where:

C=contact angle between cam and follower sear elements

A=two times the force on a follower

Fs=coefficient of friction static on cam and followers

G=force on trigger pull pin due to loading and Fs

S=force applied by the return spring

MA=mechanical advantage of the trigger lever

Tf=trigger force required to fire the release.

38. A trigger for a bow string release mechanism, the trigger adapted for actuating the release by translating the trigger action to an actuator for activating a string retaining and release element, the trigger carried in a housing, the trigger comprising:

a. a stem having one end in communication with the actuator and an opposite end extending from the housing for engagement by an archer; and b. an engagement pad on said opposite end of the trigger, the engagement pad having an ergonomic surface for matching the thumb of the archer at full draw, the engagement pad further comprising four primary surfaces defining a forward, rearward and two side surfaces, where each of the surfaces are angled such that the pad feels and functions in the same manner whether engaged by the left thumb or the right thumb when the release is properly held in the hand of the archer.

39. The trigger of claim 38, wherein the stem includes a central axis and the four primary surfaces each intercept the axis at a common point.

40. The trigger of claim 39, wherein each of the four surfaces are truncated below the common point to form an additional surface substantially orthogonal to the axis.

41. The trigger of claim 40, wherein the additional surface is of a diamond shape.

42. A bow string release mechanism having a sear assembly for selectively holding a bow string and for releasing the bow string upon actuation of a trigger, the bow string release mechanism including an actuator movable between a sear locking position and a sear releasing position for permitting movement of the sear assembly between a closed, string retaining position and an opened, string releasing position, respectively, and a trigger for controlling the actuator, the trigger and actuator being carried in a housing, the trigger further comprising:

a. an elongated stem having one end extending outwardly of the housing;

b. an actuator engaging element on the stem;

c. a mount for mounting the stem and the actuator engaging element for relative movement with respect to the housing in both a forward and a reverse direction, the actuator being responsive to each movement for activating the sear assembly to permit movement of the sear assembly from the closed, string retaining position to the opened, string releasing position; and d. a selector associated with the trigger for selectively restricting the trigger movement to either the forward or the reverse direction.

43. The release mechanism of claim 42 wherein the selector comprises a stop member adapted to be selectively positioned in engagement with the trigger stem adjacent one of said ends for restricting the movement of the stem relative to the housing.

44. The release mechanism of claim 42, further including biasing means associated with the actuator for urging the actuator into a position for maintaining the sear assembly in the closed position.

45. The release mechanism of claim 42, wherein the housing includes a handle portion adapted to be placed in the palm of the hand and gripped by the fingers, with the extended portion of the trigger stem extending outwardly from the handle in a position to be engaged by the thumb.

46. The release mechanism of claim 45, further including a thumb pad on said one end of the stem.

47. The release mechanism of claim 42, wherein the sear assembly comprises a pair of pivotable jaws having a string retaining notch therein, the actuator being adapted for engaging the jaws and maintaining them in abutting, string retaining relationship and the trigger adapted for withdrawing the actuator from the jaws for releasing them to a separated position for releasing the bow string.

48. The release mechanism of claim 47, wherein the sear jaws are mounted for full rotation relative to the housing.

49. The bow string release mechanism of claim 42 further comprising an engagement pad on said opposite end of the stem, the engagement pad having an ergonomic surface for matching the thumb of the archer at full draw, wherein the engagement pad has a raised central surface adapted to fictionally engage the thumb of the archer for accommodating both a forward fire and a rearward fire motion.

* * * * *

UNITED STATES PATENT AND TRADEMARK OFFICE

CERTIFICATE OF CORRECTION

PATENT NO. : RE 38,833 E
DATED : October 18, 2005
INVENTOR(S) : Louis R. Linsmeyer It is certified that error appears in the above-identified patent and that said Letters Patent is hereby corrected as shown below:

Title page,
Item [64], Related U.S. Patent Documents, after "Filed", remove "Mar. 14, 2004" and insert -- March 14, 1994 --.

Signed and Sealed this

Twenty-fourth Day of January, 2006

JON W. DUDAS
*Director of the United States Patent and Trademark Office*